June 25, 1929.  W. FERRIS ET AL  1,718,550
DITCHER OR SPREADER FOR RAILROAD WORK
Filed Sept. 11, 1922   10 Sheets-Sheet 6

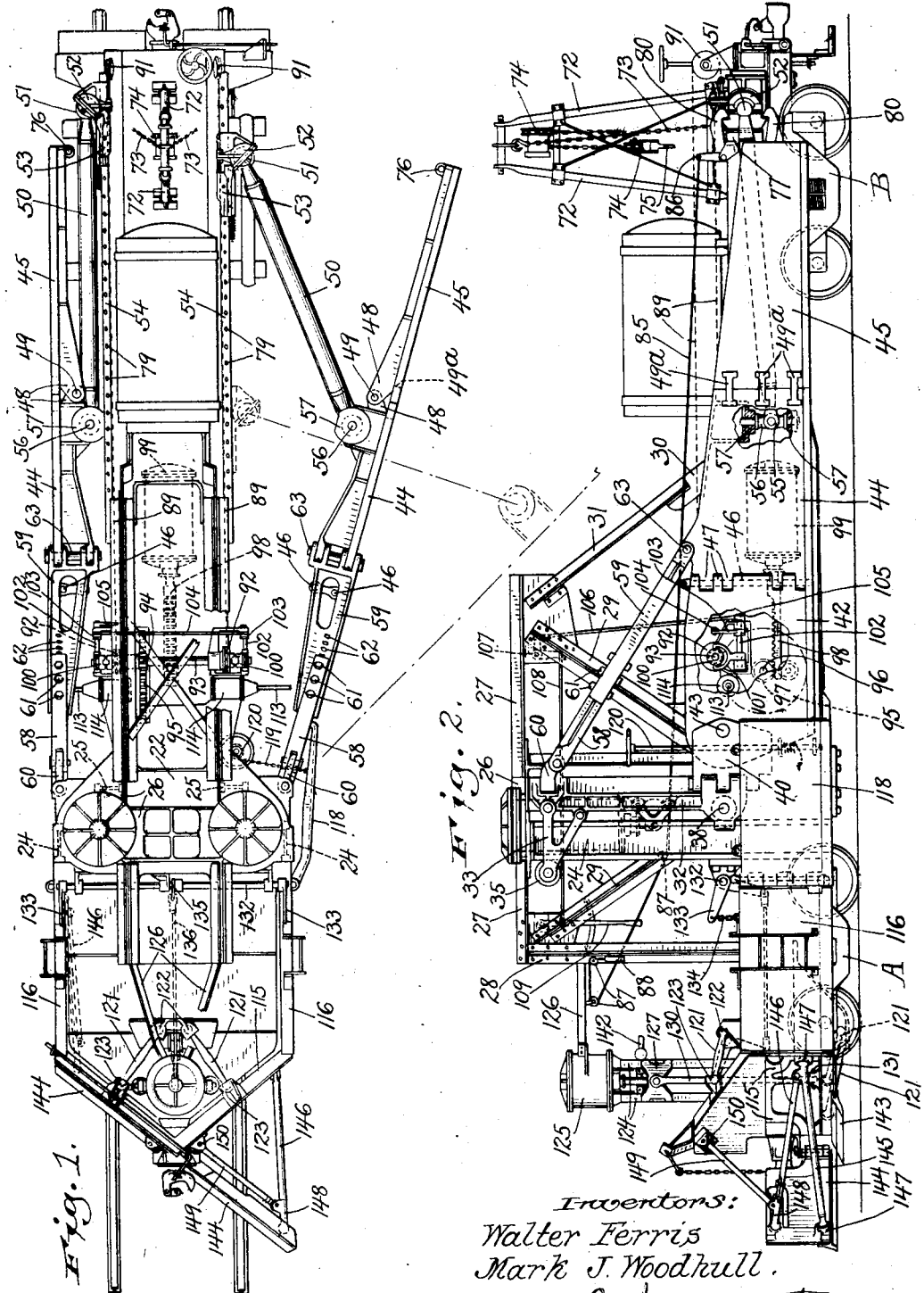

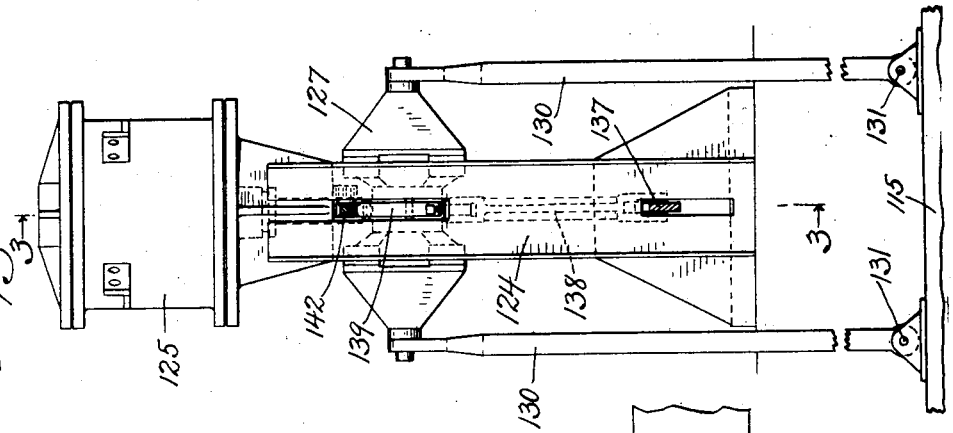

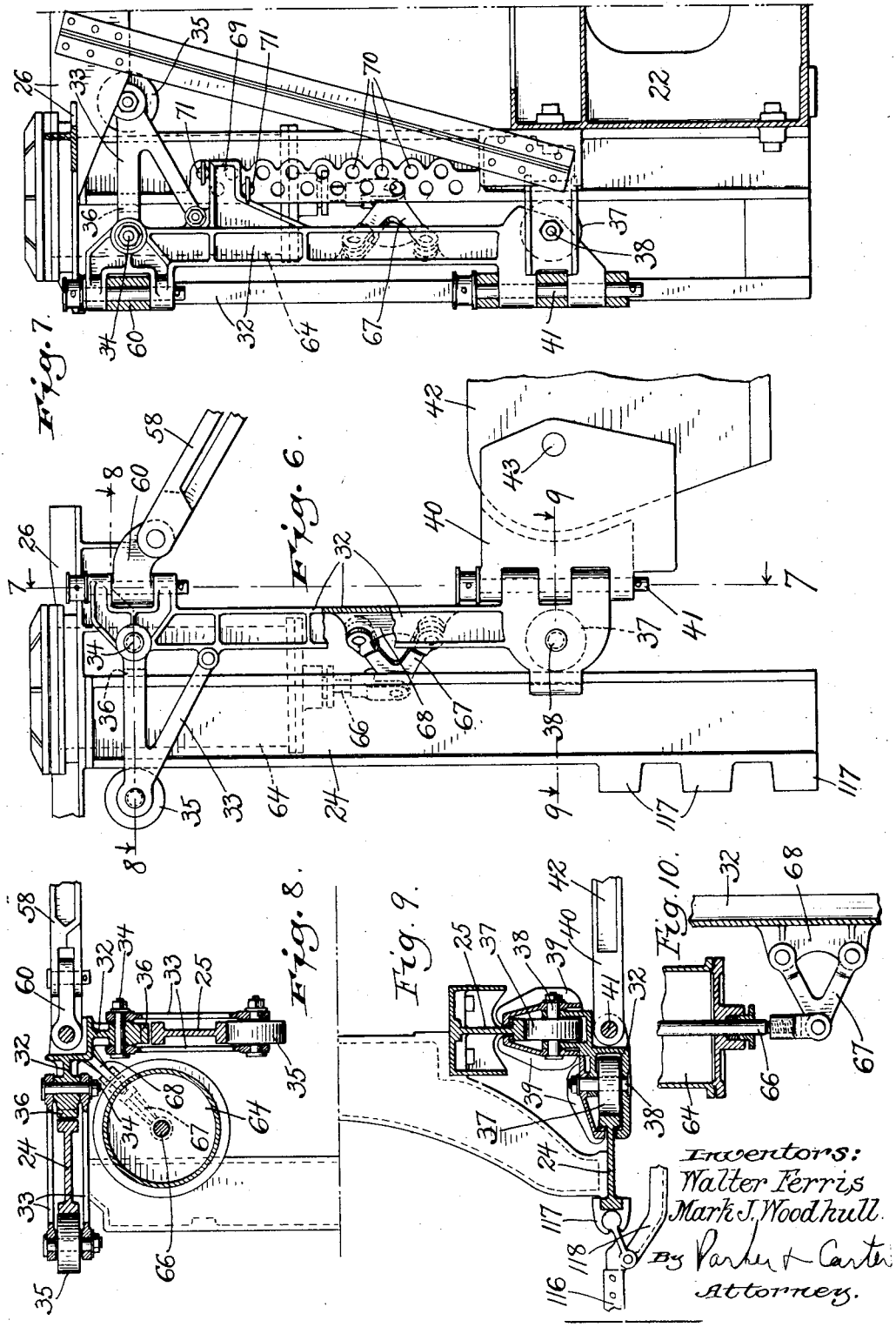

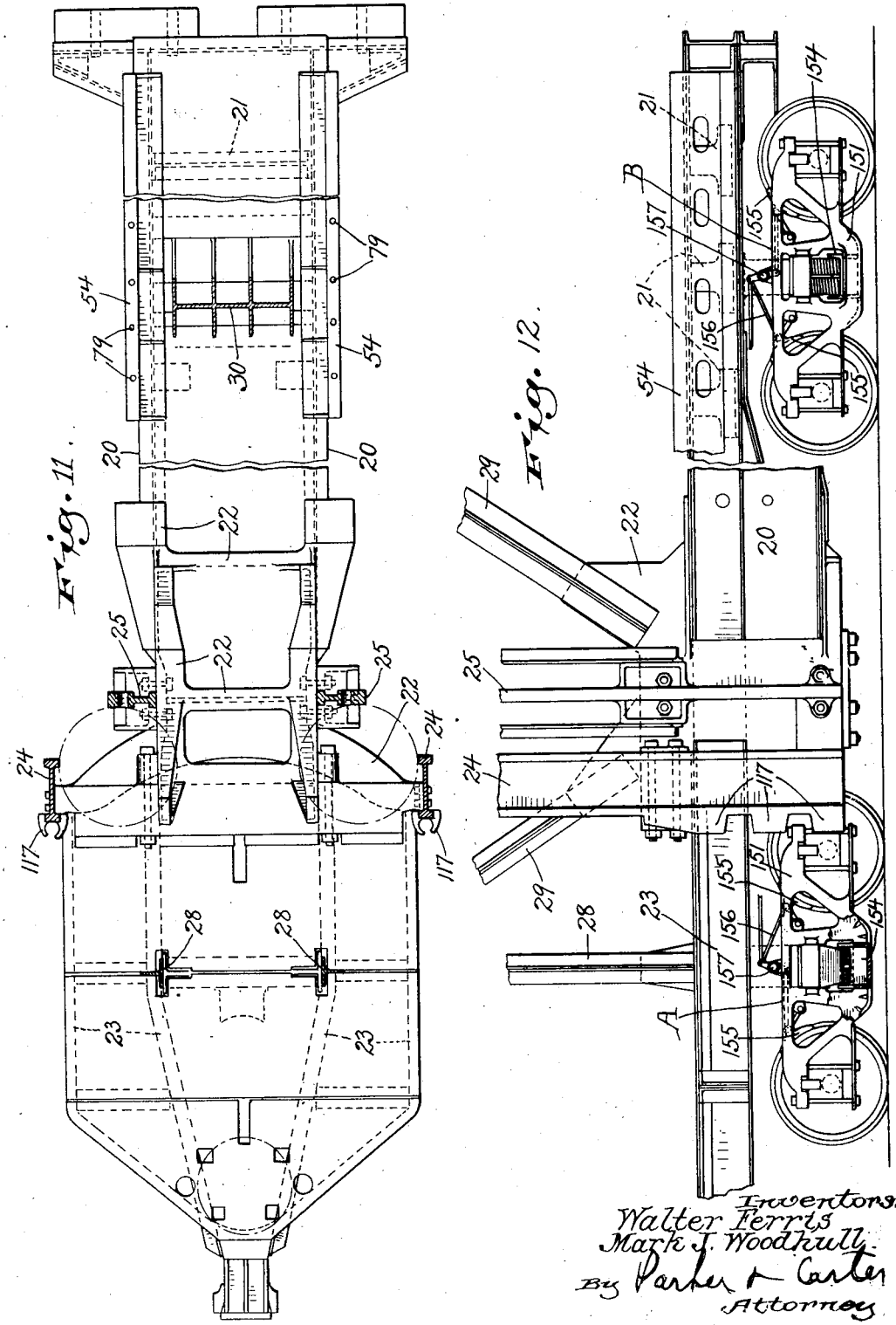

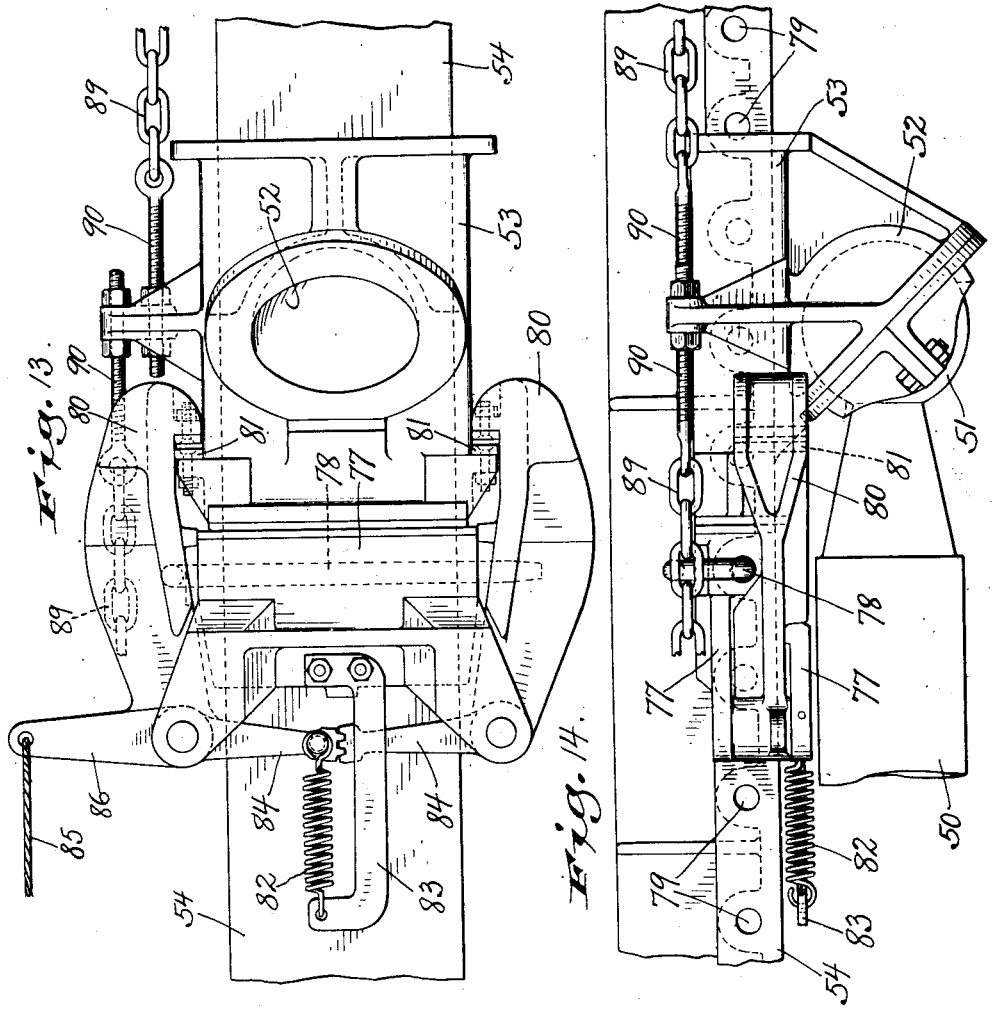

Inventors:
Walter Ferris
Mark J. Woodhull.
By Parker & Carter
Attorneys

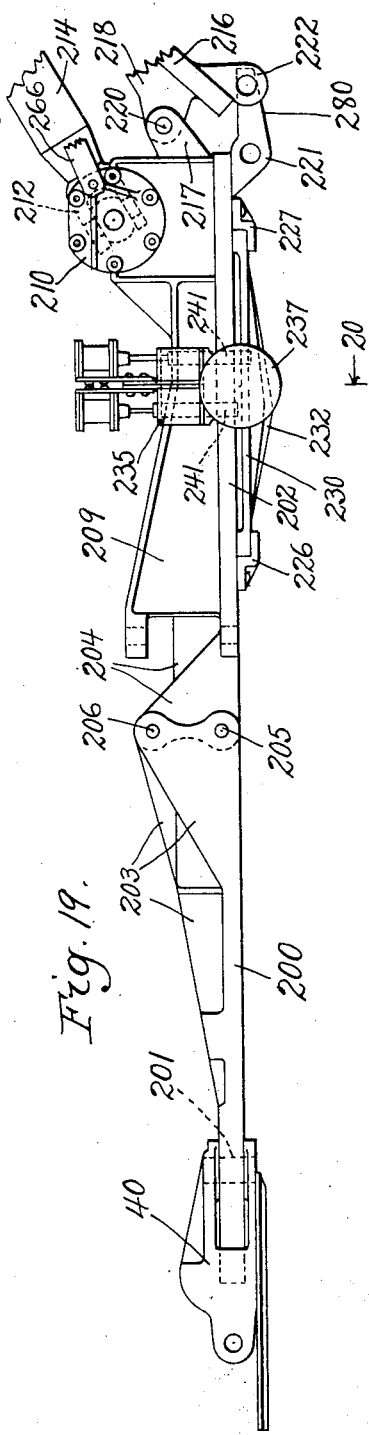
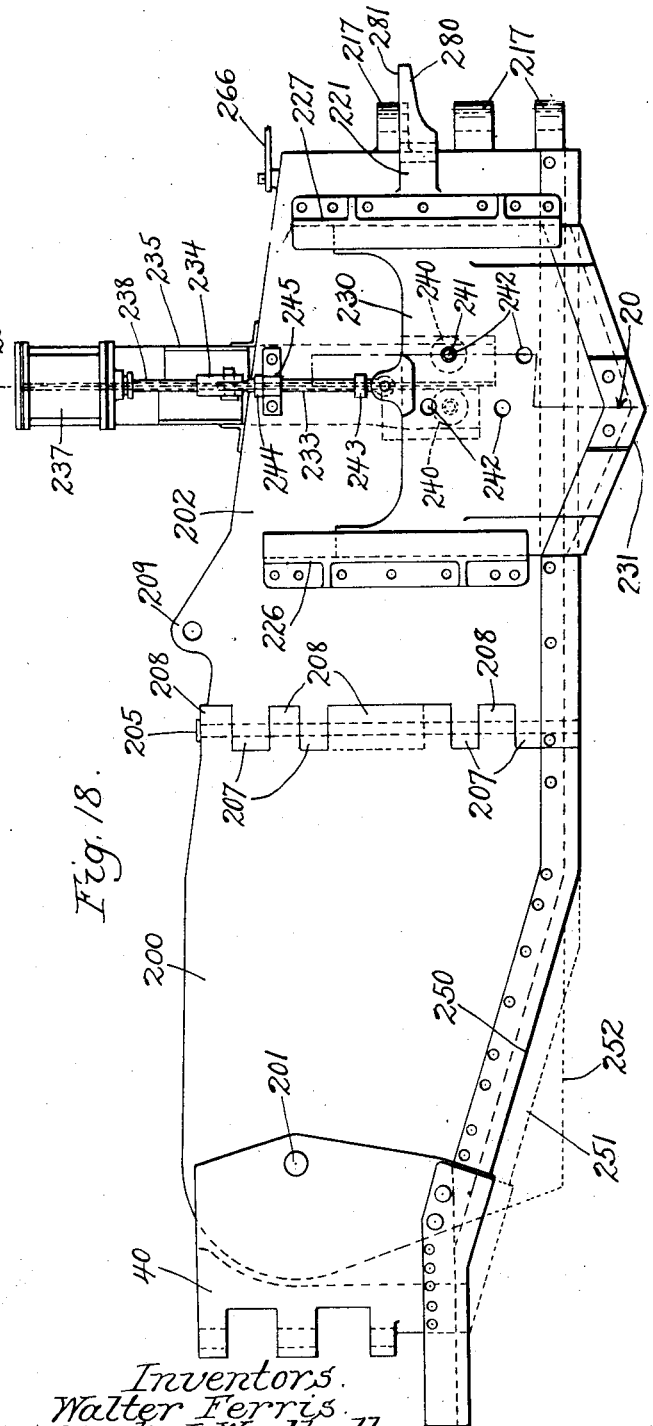

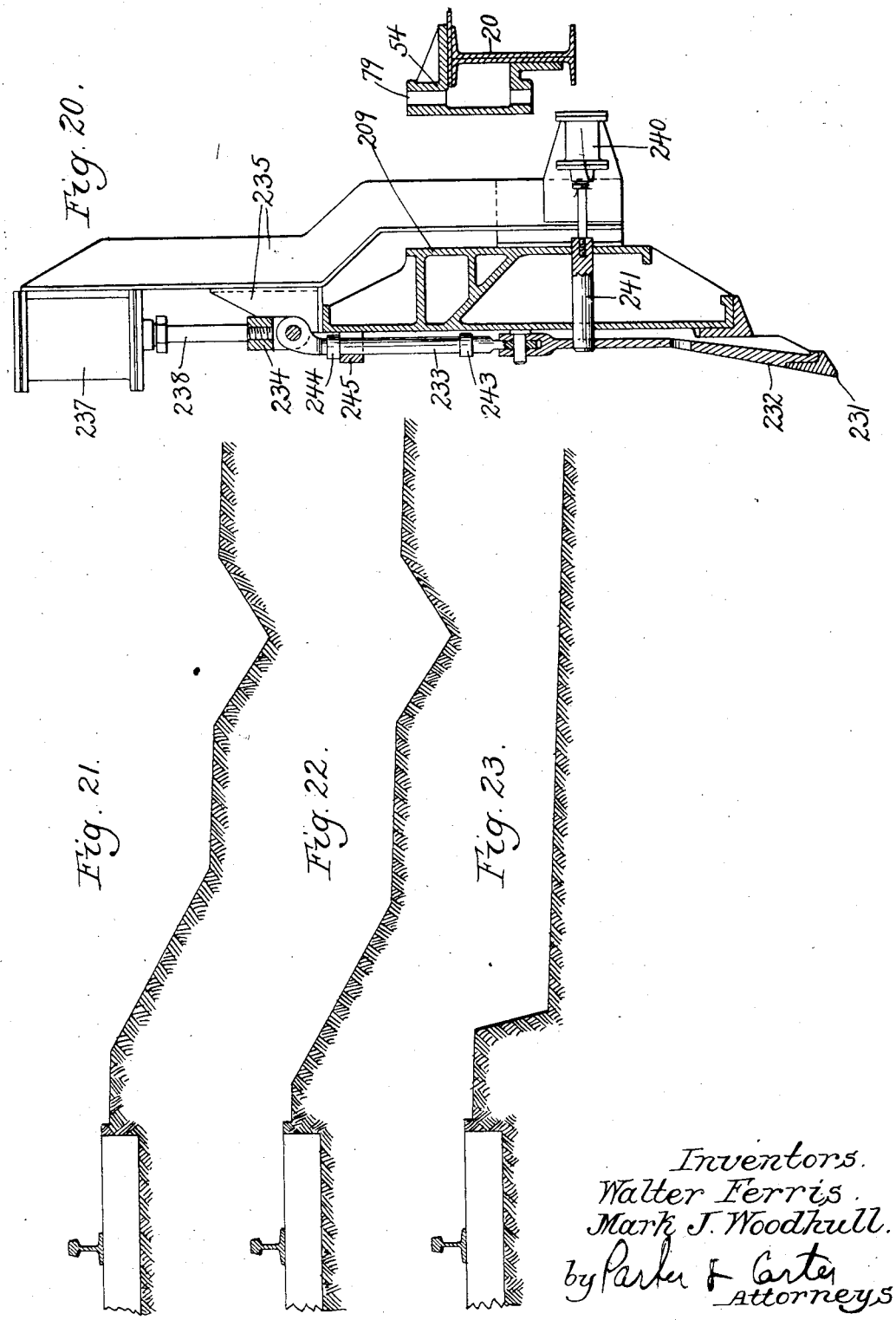

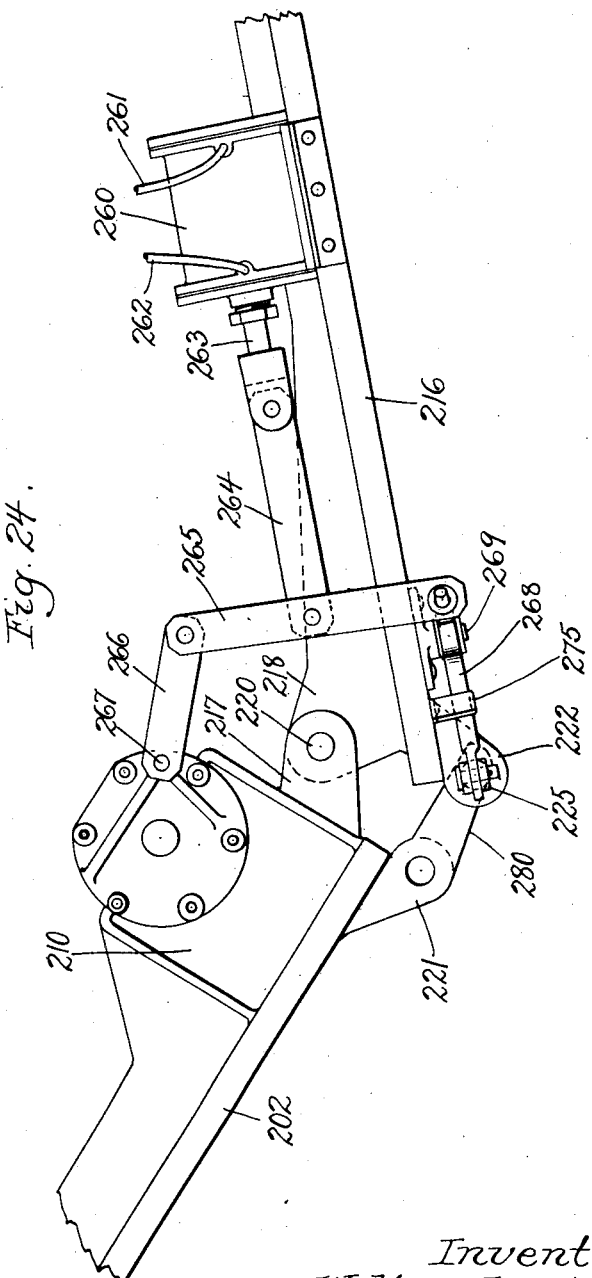

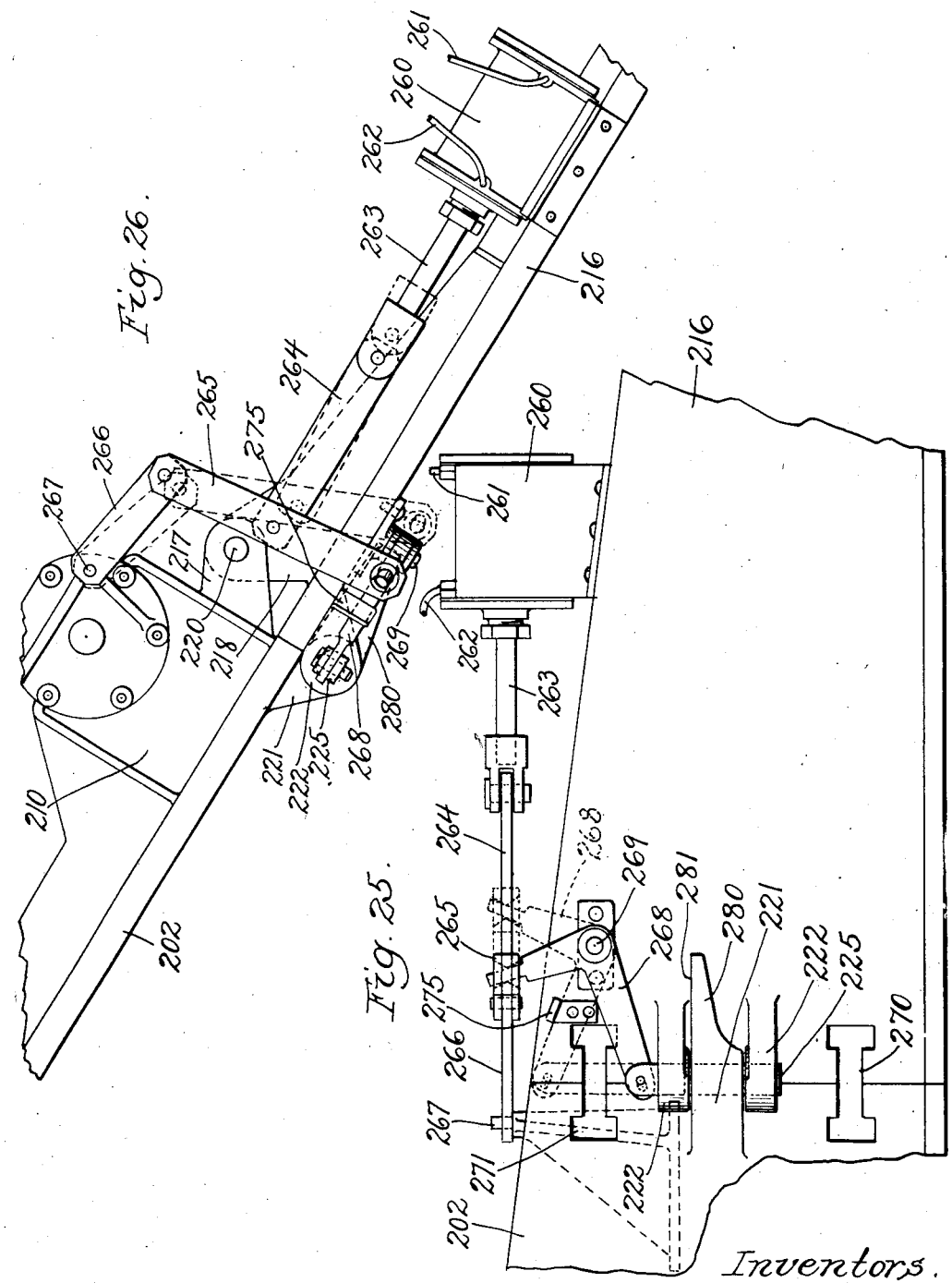

Patented June 25, 1929.

1,718,550

UNITED STATES PATENT OFFICE.

WALTER FERRIS, OF MILWAUKEE, WISCONSIN, AND MARK J. WOODHULL, OF CHICAGO, ILLINOIS; SAID FERRIS ASSIGNOR, BY MESNE ASSIGNMENTS, TO BUCYRUS-ERIE COMPANY, OF SOUTH MILWAUKEE, WISCONSIN, A CORPORATION OF DELAWARE.

DITCHER OR SPREADER FOR RAILROAD WORK.

Application filed September 11, 1922. Serial No. 587,622.

Our invention relates to improvements in ditchers or spreaders for railroad work. It has for one object to provide a new and improved form of combined or interchangeable ditcher or spreader wherein the same spreader wing which can be used for spreading ballast or material may also be used, with slight changes and modifications which can be made in place without going to the shop, for a ditcher to cut any desired predetermined ditcher track embankment profile. Another object is to provide a new and improved form of reinforcing and supporting member or apparatus for the ditcher or spreader wing so as to insure a clean cut and a smooth profile without interfering with the mobility and convenient collapsability or foldability of the device. Another object is to provide a new and improved form or arrangement of design of spreader or ditcher wing. Other objects of our invention will appear from time to time in the specification and claims.

Our invention is illustrated more or less diagrammatically in the accompanying drawings wherein:

Figure 1 is a plan view of a railway spreader plow embodying our invention;

Figure 2 is a side elevational view of the plow, portions of the spreader wing being broken away;

Figure 3 is a detailed sectional view showing the mechanism for raising or lowering the pilot plow structure, the plane of this section being indicated by the line 3—3 of Figure 4;

Figure 4 is an elevational view of said mechanism;

Figure 5 is a transverse sectional view on the line 5—5 of Figure 3;

Figure 6 is an enlarged elevational view of one of the main spreader wing columns and its associated structure;

Figure 7 is a sectional view taken transversely of the car structure on a plane indicated by the line 7—7 of Figure 6;

Figure 8 is a transverse sectional view on the line 8—8 of Figure 6;

Figure 9 is a detail sectional view on a plane indicated by the line 9—9 of Figure 6;

Figure 10 is a detailed sectional view of the operating piston-rod for moving the wing column;

Figure 11 is a plan view of the car body structure of the spreader-plow, the upstanding column portions being shown in section;

Figure 12 is a side elevational view of what is shown in Figure 11;

Figure 13 is an elevational view of the wing-shifting carriage block and its associated latch structure;

Figure 14 is a plan view of what is shown in Figure 13;

Figure 15 is an end view of the structure shown in the preceeding two figures, with the guide track and associated car body structure in section;

Figure 18 is a detail side elevation on an enlarged scale, of another form of spreader wing;

Figure 19 is a plan view of the wing shown in Figure 18;

Figure 20 is a section along the line 20—20 of Figure 18;

Figures 21 to 23 are diagrammatic sections through a road bed showing various profiles such as may be obtained by manipulation of our device;

Figure 24 is a plan view on an enlarged scale of an arrangement for operating the outer section;

Figure 25 is a front elevation of the same;

Figure 26 is a plan view of the structure of Figure 25.

Like parts are represented by like numbers throughout the specification and drawings.

Figure 16:
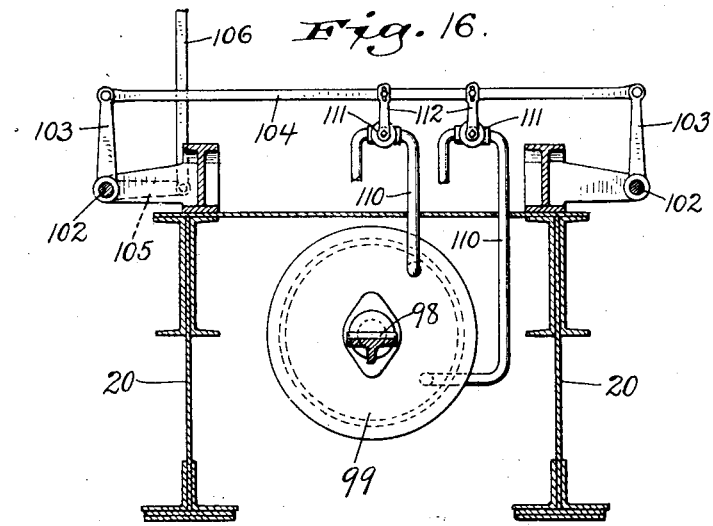
Figure 16 is a transverse sectional view showing the common control mechanism for the clutches and throttle valve means of the wing swinging mechanism.
Figure 17:
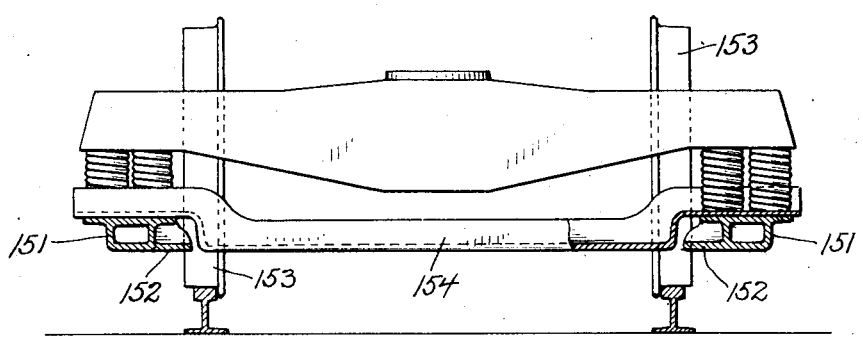
Figure 17 is a detailed view showing the wheel truck structure adapted to support the car body on the rails in the event of derailment of the wheels.

The spreader-plow is illustrated as being mounted upon a car body formed of a rear section of the gondola type of car construction including the side plate structures 20 and transverse diaphragms 21 and this rear section is connected at its forward end with an exceedingly heavy intermediate casting 22 extending entirely across the width of the car and of sufficient depth to provide for attachment of the forward ends of the relatively deep side plate structures 20 thereto. A sill frame-work 23 is connected with and extends forwardly from the intermediate casting, the front truck A of the car-body being disposed under and connected with this sill framework, while the rear truck B of the car body is connected in the usual manner with the rear section of the car body. A pair of upstanding guide beams 24 and 25 respectively, are provided at each side of the car body and these beams also form the standards of a truss-frame including an upper tie casting 26 connecting said beams and having horizontal beams 27 secured thereto. Forward truss beams 28 connect the beams 27 with the intermediate portion of the forward sill-frame 23, and diagonal truss-beams 29 connect the ends of the beams 27 with the intermediate casting of the car body. The rear car body section carries an intermediate transverse casting 30 which is connected by the diagonal truss beams 31 with the rear end portions of the beams 27 and thus an exceedingly strong truss-frame structure is provided which is braced in such manner as to uniformly distribute the stresses set up therein. The rear section of the car body is of considerably lesser width than the usual width of car structures to meet standard clearance requirements, whereby, to provide for proper clearance of the main spreader wings when folded thereagainst, in conjunction with the particular novel structure of the spreader wings. The forward sill frame section of the car body is of relatively greater width and the forward end of the casting 22 is correspondingly widened for connection therewith.

The guide standards 24 and 25 afford the support for a pair of vertically movable wing columns 32. Said standards are formed of I-beam castings, the standards 24 being disposed in planes extending longitudinally of the car body at the sides of the forward car body portion, and being secured to the widened forward end of the casting 22, while standards 25 are disposed in a plane extending transversely of the car body rearwardly of the standards 24, the outer edges of the standards 25 being spaced a considerable distance inwardly of the planes of the standards 24. The wing columns 32 are located in the angles defined by the planes of the guide standards, said columns being angular in cross-section with their side portions lying in the respective planes. A pair of V-shaped bracket members 33 is secured to the upper end of each side portion of each of the columns 32, by bolts 34 passed through the ends of the legs of said bracket members, each pair of bracket members extending transversely at the sides of the corresponding guide standard and carrying an anti-friction roller 35 at their bight portions which rides against the edge of the standard. Wear-plates 36 are also carried by the upper ends of the columns for engagement with the adjacent edges of the guide standards under certain conditions of stress. The lower ends of the sides of the columns are recessed to receive rollers 37 mounted on bolts 38 passed through said column sides and engageable with the adjacent edges of the guide columns, and said bolts also provide securement for plate members 39 extending from the column sides and having portions engageable with the inner sides of the adjacent flanges of the guide standards under the conditions of stress which procure engagement of the upper wear plates 36. The columns 32 are thus carried by the pairs of guide standards in such manner as to procure a minimum amount of friction upon movement of the columns when the spreader wings are suspended therefrom, by reason of the rollers 35 and 37, while at the same time the columns are connected with the standards in such manner as to adequately meet the various stresses which would be imparted to the wings in the working operation thereof.

The lower end of each column carries a hinge-block 40 which is provided at one side with pivot ears coacting with similar ears on the lower end of the column for the reception of a pivot-pin 41. The outer side of the block is recessed for the reception of the inner end portion of an inner spreader wing section 42 which is pivotally mounted in the recess by a bolt 43, said spreader wing section extending a considerable distance below the hinge-block. Each of the spreader wings is formed of the inner section 42, an intermediate section 44 and an outer section 45, each of these sections being formed of a single steel casting. The inner and intermediate sections of the wing are rigidly connected by a pair of bolts 46 passed through co-acting ear portions 47 on the adjacent ends of the wing sections. The intermediate and outer sections of the wing are provided with co-acting series of ears 48 at their inner sides, through which is passed a bolt 49, and the sections are normally held in rigid connection by bishop-bolts 49$^a$ inset in the meeting edge portions of the wing sections, these bolts being so designed as to yield upon the occurrence of abnormal stress, permitting the outer wing section to swing inwardly on the bolt 49 and thus avoid damage to the general structure incidental to engagement of the wing with a practically immovable object. If desired, the bolts 46 connecting the inner and intermediate sections may be also formed with a definite yielding factor.

We have thus provided a wing which possesses an exceedingly great amount of strength, whereby it may be held in outwardly swung position against its work by a single strut connection therewith, and the wing is of such width as to meet the standard railway clearance requirements when folded against the car body, by reason of the fact that said wing is formed entirely of cast metal. We have found that the provision of a wing formed of structural metal in accordance with the usual practice would be of too great width if designed to possess the strength required in our wing structure.

Also, the additional weight involved in forming the wing by casting affords a counterbalance action for the wing against lifting tendencies encountered in the work of the device, and increased strength of the general wing structure for the purpose of single strut connection, also insures against damage to the wing incidental to severe conditions of use and conduces to the provision of a spreader plow apparatus which has been found to be practically unbreakable under actual service conditions of the most severe character.

The single strut member 50 of each main spreader wing is preferably formed of tubular metal and carries a ball head 51 at one end engageable in the socket portion 52 of a carriage block 53 slidable on a guide-track 54 carried at one side of the rear section of the car body. The other end of the strut terminates in a yoke portion 55 of a universal joint connection with the outer end portion of the intermediate wing section 44, said yoke portion being pivoted to a vertical shaft section 56 having its ends mounted in bearing ears 57 on the wing section, said universal connection being disposed approximately at the center of the wing inasmuch as the outer wing section 45 is somewhat longer than the other sections and thus the strut member takes the main thrust of the wing load adjacent the center of stress. The means for holding and adjusting the carriage block 53 will be later described.

Each main spreader wing is held in desired vertical angularity by a diagonal hanger brace comprising an inner section 58 and an outer section 59. The inner section is pivoted to a block 60 which is in turn pivoted to the upper end of the wing column on an axis which coincides with the pivotal axis of the hinge-block 40. The major portion of the brace section 58 is bifurcated for the reception of the outer section 59 and said outer section is taperingly increased in width towards its outer end and is provided with side flanges against which the upper section is slidable. These sections of the brace are adjustably connected by a series of bolts 61 passed through the furcations of the upper brace section and selectively engaged in certain of a series of apertures 62 in the lower brace section. The lower widened end of the brace is provided at each corner with a pair of pivot ears adapted to receive therebetween an ear portion of the spreader wing, and a bolt 63 is passed through all of said ears, providing a pair of transversely spaced points of connection of the brace with the main spreader wing, these connections being located adjacent the center of stress of the wing when in operation, and the widening of the brace member affords lateral rigidity thereto to take the torsion stresses set up incidental to operation of the wing and transmitted through the transversely spaced connecting points of the brace. It is also noted that this brace functions as a tension brace when the machine is not in active use, and thus holds the wing in desired suspended position, and when the machine is in active use, with the wing engaged against the work material, the brace acts as a compression member, holding the wing to its work, and taking the upward components of stress and the torsional components of stress, as stated. It is also noted that a line drawn from the axis of the universal joint connection of the strut member 50, to the hinge axis of the wing will pass between the points of connection of the tension and compression brace member with the wing, and that the connection of the single strut member 50 is disposed below the hinge block connection of the wing while the tension and compression brace connections are disposed thereabove, thus providing an arrangement which is most effective to meet the great tilting stresses encountered in operation, and which will hold the wing in a proper vertical plane, this feature being particularly important in view of the excessive vertical stresses which are set up by camming of the work material should any tilting action of the wing be permitted.

For raising and lowering the wings bodily, whereby said wings may operate at any desired elevation, a pair of cylinders 64 are carried by and depend from the tie-castings 26 of the car-body truss frame within the angles of the pairs of guide standards 24 and 25, the cylinders being supplied with pressure fluid in any suitable manner for the operation of a piston therein (not shown) which carries a stem 66 depending from the cylinder and connected by a V-shaped coupling member 67 with an attaching flange 68 of the corresponding wing column 32. It is noted that this piston stem is disposed a lesser distance from the wing column than the bearing rollers 35 of said column and thus a direct lifting action is procured conducing to an economy of power and friction in operating the wing column. The column is held in desired adjustment position against movement in either direction by a holding lug 69 thereon movable adjacent the corresponding guide column 25, said column being provided with a thickened portion formed with a staggered series of openings 70 for the reception of a pair of pins 71 adapted to engage the top and bottom portions of said holding lug.

For adjusting the vertical angularity of the main spreader wings, a frame formed of convergent standards 72 braced by chains 73 is provided at the rear end of the car body and this frame carries a suitable lifting tackle 74 including a hook member 75 engageable in an eye 76 at the rear extremity of either wing, for raising said wing to its desired vertical angle when the bolts 61 of the upper wing brace have been removed to permit relative movement of the sections of said brace, the bolts being subsequently replaced to hold the wing in its desired adjustment.

The means for shifting the strut carriage block 53 provides the adjustment of horizontal angularity of the main spreader wing and also provides for the retraction of the wing against the side of the car body to procure proper clearance when the plow is not in operation, and this retraction of the wing may be effected without disturbing the other adjustments thereof, since the wing may move directly inwardly from any position of elevational or angular adjustment, excepting of course when the wing is disposed below the plane of the rails, in which instance it would first be necessary to raise the wing and then swing the same inwardly.

Each guide track 54 comprises an elongated casting secured on one side edge of the rear section of the car body, and the strut carriage block 53 has portions embracing said track to hold the block thereto for sliding movement. The carriage block is held against such sliding movement by connection with a holding block 77 which is also mounted for sliding movement on the carriage block. This holding block is adjustably locked on the carriage-block by a pin 78 passing through the holding block and through one of a series of pin-holes 79 in the track casting. A pair of pawls 80 are pivoted to the top and bottom portions of the holding block 77 and are adapted to engage with shoulders 81 formed on the carriage block, when said blocks are moved to abutment on the track, said shoulders having their forward edges cammed to automatically procure this forward engagement of the pawls, the pawls being connected for simultaneous sliding movement and resiliently urged inwardly by a spring 82 carried on a bracket arm 83 of the holding block and connected with one of a pair of intermeshing gear segment arms 84 carried by the pivoted end portions of the pawls. To procure release of these pawls from a main control point at the front of the car body, a cable 85 is secured to an upstanding arm 86 on the upper pawl member and is extended forwardly of the car body and trained about pulleys 87 adjacent said control point, a suitable weight 88 being secured to the end of the cable whereby to hold the cable taut in the various positions assumed by the holding block along the track.

For selectively effecting movement of the carriage block 53 of the strut member of either main spreader wing, a chain 89 has its ends secured to each of the carriage blocks by suitable tension adjusting bolts 90 and the rear end of each chain is trained about a sheave 91 at the rear end of the car body, while the forward end of each chain is trained about a drive sheave 92 at the forward end portion of the rear section of the car body, these drive sheaves 92 being loosely mounted on a shaft 93 extending transversely of the car body. This shaft is driven by a pinion 94 thereon meshing with a relatively large gear wheel 95 carried on a shaft 96 mounted under the shaft 93, said shaft 96 carrying in turn a pinion 97 meshing with a gear-rack 98 carried by the piston-plunger of a fluid pressure cylinder 99. Clutch members 100 are splined on the outer end portions of the shaft 93 and are engageable with corresponding clutch portions carried by the drive sheaves 92, said clutch members being selectively engageable with the sheaves and being controlled for such engagement by spanner arms 101 connected therewith and mounted on rock-shafts 102 at the sides of the car body, said rock-shafts being connected for simultaneous movement by upstanding arms 103 thereon pivoted to a transverse link 104, and one of the shafts carries an arm 105 connected by an upstanding link 106 with an angle lever 107 on a truss-frame, which lever is in turn connected by a forwardly extending link 108 with a depending control lever 109, at the point of control, whereby upon swinging the lever 109 the clutch members may be shifted to engage either drive sheave 92 or to lie in neutral position. Fluid pressure is supplied to either end of the cylinder through pipelines 110, controlled by any suitable valve mechanism (not shown) located at the main point of control for the apparatus, and thus either of the wings may be swung inwardly or outwardly by fluid pressure means operating from a common motive source. In some instances it will be desired to shift the piston rack 98 to assume proper position for subsequent operation of a particular wing. To prevent severe operating shock which would be occasioned by such operation when the piston rack is not under load, the clutch members being in neutral position, valves 111 are disposed in the cylinder pipe-lines 110 and are connected by arms 112 with the cross-link 104 of the clutch mechanism, said valves being closed when the clutches are in neutral position, the valves permitting a certain leakage therethrough sufficient to operate the piston-rack. The valves are opened when the link is shifted to engage either of the clutches and thus permit full force of fluid to be exerted in the cylinder.

In moving either of the main spreader wings to a desired extended position from retracted position, the coacting holding block 77 is thus set at a certain position along the trackway corresponding to the desired angular projection of the spreader wing. Clutch connection is then established with the proper drive sheave and the piston-rack 98 is then actuated to impart a driving action through its increasing train of gears and through the corresponding chain 89 to propel the carriage 53 along the trackway and thus procure outward swinging movement of the spreader wing until the carriage engages the holding block 77, whereupon the pawls 80 of the holding block will automatically lock the carriage thereto, to thus maintain the wing in its proper position for operation, and it is noted that the pin 78 which secures the holding block against movement is designed with a certain predetermined yielding factor whereby excessive stress on the wing past a certain desired limit will cause said pin to be sheared off, thus permitting collapse of the wing against the car body. By the present arrangement, the adjustment setting for the desired position of the spreader wing is effected prior to the swinging movement of the wing to such position, thus increasing the convenience of operation and the accuracy of positioning of the wing.

When the wings are in extreme inward position, the connection of the strut members 50 of the wing moves inwardly of a line drawn through the connections of the wing and strut with the car and it thus becomes necessary to shift the wings outwardly a slight distance prior to actuation of the operating means for the strut carriage. This action is effected in our present structure by a pair of pusher-plungers 113 projecting from motor cylinders 114 located transversely at the intermediate portion of the car body, supply of fluid pressure to these cylinders being controlled in any suitable manner to impart the initial outward thrust to the wings. The entire manipulation of the spreader wings is thus effected mechanically, providing a spreader plow apparatus which may be manipulated conveniently and rapidly by a single operator.

A pilot plow structure is disposed at the front of the car body, and comprises a framework of relatively wide V-shape in plan, this framework being formed in the present instance of a steel casting 115. Side walls 116 are secured to the legs of said frame and extend rearwardly at the sides of the forward section of the car body, the rearward ends of these side walls being engaged in guides 117 at the lower ends of the forward edges of the guide standards 24. Supplemental wing members 118 are hinged to the rear ends of the walls 116 and are adapted to slidably engage the inner end portions of the main spreader wings, these auxiliary wings serving to shield the space between the pilot plow walls and the main wings, as well as to break the abruptness of the angle at the juncture of the main wings and car body. The position of the auxiliary wings is controlled by chains 119 secured thereto and wound on turn posts 120 carried by the car body. The pilot plow frame is supported for movement in a substantially vertical plane by upper and lower sets of strut braces 121. The braces of each set are divergent forwardly and outwardly from ball and socket connections 122 with the forward sill frame structure of the car body, and the outer end of the strut braces have ball and socket connections 123 with the frame 115 whereby to adequately take up stress exerted against the pilot plow frame in any general rearward direction. For moving the pilot plow frame to procure its desired vertical adjustment, a plurality of posts 124 are provided on the forward end portion of the car body and support a cylinder 125 which is connected by braces 126 with the truss frame. These posts also slidably support a cross-head 127 which is connected by a piston-rod 128 with a piston 129 slidable in the cylinder. Pressure fluid may be supplied to the cylinder in any suitable manner to raise or lower the piston, and the cross-head is connected by links 130 with the lower portions of the arms of the pilot-plow frame at the points 131, as shown in Figure 2. Vertical movement of the rear portions of the walls 116 is controlled by a transverse shaft 132 journaled on the car body and having forwardly extending arms 133 connected by suspension chains 134 with the walls. An arm 135 is carried by the central portion of the shaft and is connected by a forwardly extending link 136 with one arm of an angle lever 137 which in turn has its other arm connected by a link 138 with the cross-head 127 to thus procure simultaneous movements of the front and rear portions of the pilot plow structure. By employing a simple suspension mechanism for the rear portion of the pilot plow structure, a relatively light mechanism may be provided, while the forward portion of the pilot plow structure is afforded a positive downward thrust to insure its proper positioning, particularly should ice or other stubborn material be disposed on the trackway. It is noted that when the pilot plow structure is raised, that portion of the piston stem 128 which is subjected to bearing action, is disposed within the cylinder and thus protected against the action of the elements when the machine is not in active use. The pilot plow structure is automatically secured in raised position upon movement to such position by a pair of pawls 139 depending from pivotal connections with the cylinder structure and engageable with shoulders 140 on the cross-head 127, said pawls being connected for simultaneous movement by intermeshing gear segment arms 141 thereon, and being releasable to permit lowering movement by a weighted handle 142 projecting outwardly from one of the pawls and serving normally by its weight action to urge the pawls to engaging position.

The lower edge of the pilot plow frame carries a scraper shoe 143 depending below said frame and adapted to engage between the rails of the trackway to rout out ice or other material between the rails and an exceedingly strong structure is provided by the attachment of this relatively heavy shoe member to the frame 115. This shoe member co-acts with and may form the lower scraper edge of a pair of wing members 144 which are pivoted to the apex portion of the supplemental frame, and which lie against the sides of the frame to deflect material to both sides of the rails.

Either of these wings may be also held in forwardly inclined position to form a continuous spreader surface in conjunction with the other wing whereby to deflect all of the material engaged by said wings to one side of the trackway. For holding either of the pilot wings in this forwardly swung position, a pair of pivotally connected upper and lower brace bars 145 and 146 are provided, which are pivotally connected adjacent their rear ends, the bar 145 terminating at its ends in ball heads engageable in sockets 147 carried by the lower outer corner of the wing and by the rear portion of the frame. The free end of the bar 146 is provided with a headed portion slidably engageable in a channel-way 148 which is provided at the upper portion of the wing, said channel-way being closed at its outer end. A third brace bar 149 has one end pivoted to the outer end portion of the bar 146 and at its upper end is detachably engageable with bracket ears 150 carried by the upper portion of the pilot plow frame. When this end of the bar 149 is so engaged, with the headed end of the bar 146 disposed in the outer end of the recess, and the other parts in assembled position, the entire wing brace structure is secured against disassembling and an effective brace arrangement is provided for holding the wing in its outwardly swung position. This entire structure may be disassembled by releasing the bar 149 from the bracket ears 150, whereupon the wing may be swung outwardly and the brace structure simultaneously swung inwardly to detach the bar 146 from the channel-way. This brace structure may be employed with either of the wings 144 and may be conveniently stored when both wings are engaged against the frame 115.

A car structure of the present type, particularly when operated on temporary unballasted trackway, is very liable to derailment, with possible breakage of the truck structure incidental to engagement of the rail therewith and to tendency of the rail to become wedged between the wheels and adjacent portions of the truck structure. Also, there exists a liability of the wheels to tear up the unballasted trackway upon derailment, particularly when the trackway is of soft material. To prevent such damage, each of the side frames 151 of the trucks A and B of our car body structure is provided with an inwardly extending ledge 152 preferably cast integrally therewith, said ledges projecting past the planes of the outer sides of the wheels 153, and the spring plank 154 of the truck is downwardly offset as in the present instance, or otherwise so formed that its lower portion extends beyond or lies flush with the lowest portion of the remainder of the truck, and if desired, low spring plank portions may be extended outwardly of the side planes of the wheels in lieu of the brackets 152 heretofore described. Any wedging action of the rails upon derailment of the car body is thus positively prevented, and the wheels of the trucks are prevented from digging up the trackway by reason of the seating engagement of the truck structure on the rails. Damage of the brake mechanism incidental to possible derailment is prevented in the present structure by disposing the brake shoes 155 at the upper portions of the wheels, said shoes being operated by links 156 connected with the arms of a rock-shaft 157 disposed at the upper portion of the truck-frame.

In Figure 18 and following, a different type of wing control is illustrated in which 40 is the hinge block pivoted, adjacent the bottom of the column 32 as earlier described. 200 is the inner wing section pivoted on the hinge block 40 for rotation with respect to it about a horizontal axis, being pivotally mounted as at 201. 202 is the center wing section pivoted along the outer edge of the inner wing section 200. It will be noted that these wing sections are reinforced by integral brace members or brackets 203, 204 which are widened especially at the intersection of the two wings so that the spaced pins 205, 206 passing through the interlocking ears 207, 208 may hold the two sections together to form the rigid wing. Projecting rearwardly from the back side of the center wing section 202 and forming a part of the stiffening or reinforcing system is a bracket 209 projecting at its upper end just above the top of the wing and extending backwardly from the wing a considerable distance. Pivoted on this bracket 209 is the diagonal hanger brace 59 elsewhere described, and serving to support the wing.

210 is a projection from the rear side of the center wing section 202 adjacent its outer lower edge, on which is pivoted the forked end 212 of the thrust strut 214 which strut has at its other end the pivoted, sliding connection earlier described in connection with the strut 50.

216 is the outer wing section. It is articulated by means of overlapping brackets or ears 217, 218, projecting from it and from the center section and the pivot 220 passing through them. The two sections are held against rotation with respect to each other by perforated ears 221, 222, projecting from the two wing sections through which passes the pin 225. When the wing is used for ditching, this outer wing section can be easily removed and carried on the car body, but when it is used for scraping, this outer wing section will be attached and put into operation.

226, 227 are inner and outer ditcher guides carried by the center wing section. Slidable in them is a ditcher plow 230 having a cutting edge 231. This plow is bent slightly forward at its bottom as indicated at 232 and has for its purpose as it projects downwardly below the surface of the scraper wing to cut a ditch relatively narrow in width and relatively widely removed from the body of predetermined depth and contour, the contour being fixed by the shape of the plow, the depth being dependent on the distance the plow is thrust downwardly below the wing. 233 is a link pivoted on the upper edge of the plow and at its upper end on a cross head 234 slidable on a combined cross head guide and cylinder support 235, 237 is a hydraulic cylinder mounted on the support 235. 238 is a piston rod interposed between the cylinder and the cross head guide whereby power may be applied between the cylinder and rod to raise and lower the plow.

Mounted beneath the cylinder support 235 is a locking cylinder or cylinders 240 which operate a locking pin or pins 241 passing through the bracket itself and the face of the wing section and adapted to penetrate within the adjusting holes 242 in the ditcher plow, to lock the plow in a plurality of positions. Stops 243, 244 on the link 233 engage the bracket or guide 245, to stop the plow at either limit of its excursion in such position that the locking pin is opposed to a hole in the plow.

The inner lower edge of the inner wing section is cut away as indicated at 250 and an adjustable profile shoe 251 is adapted to be bolted in position to give any desired profile form depending upon the shape of the shoe. A number of different shoe shapes can be used as for instance at 252 which merely forms a scraper or cutting edge for the cut away portion of the wing.

When the apparatus is being used as a ditcher rather than as a scraper, it frequently happens that it is desirable under some conditions of operation to have the outer wing section working, as it tends to grade up and level up the embankment beyond the ditch; but it also happens that as the scraper passes along it may come to places—as, for instance, in a cut—where the outer wing section would be in the way and tend to disturb the walls of the cut. Under this condition, means as disclosed in Figures 24 to 26 are provided for retracting the outer wing section. In this case the bishop bolts or links 49ª are removed and that leaves the wing section free to rotate on the pivot pins 220.

260 is a pneumatic cylinder mounted on the outer wing section 216. Air is conducted to this cylinder from the control station on the car through the flexible pipes 261, 262. 263 is the piston rod driven by a piston inside the cylinder. This piston rod drives a link 264 which is pivoted at its outer end to the middle of a yoke 265. This yoke is pivoted at one end on a pivoted link 266, which in turn is pivoted on a fixed fulcrum 267. The other end of the yoke 265 is apertured to engage a bell crank lever 268 which lever is pivoted for rotation about a pintle 269 on the face of the outer wing section 216. The other end of this bell crank lever engages and controls the pin 225 which passes through the ears or lugs 221, 222 on the faces of the intermediate and outermost sections, respectively of the wing, and holds the sections against rotation this being a substitute for the bishop bolts 49ª shown in another form, though both the bishop bolts and the pin and lug arrangement may be used interchangeably or together under various operating conditions. In order to bring out this, I have shown, as at 270, 271 the spaces for these bishop bolts with the bolts removed. 275 is a stop against which the bell crank lever comes to rest on its upward movement, so as to prevent further rotation and permit the power of the cylinder to fold the wing back.

The lug 221 has an extension 280 projecting over in front of the outer wing extension. This member 280 has a flat upper table or surface 281 that rides under the upper lug 222. As soon as the pin 225 has lifted out of the lower lug 222, and as soon as the outer wing extension 216 has commenced to rotate the pin 225 is out of line with the hole in the lug 221 and cannot re-enter that hole until the wing has been returned to its extended position.

While we have shown and described a preferred embodiment of our invention, it will be appreciated that various changes and modifications of structure and arrangement may be employed to meet differing conditions of use and manufacture without departing in any manner from the spirit of our invention as defined by the appended claims.

The use and operation of our invention are as follows: The invention herein relates to an improvement in spreader plows for use on railroads and of the type comprising a car body having spreader wings in hinged connection therewith and provided with means for adjustably holding said wings in outwardly swung relation to the car body.

Heretofore, spreader plows of that type intended for moving relatively large amounts of material at one time, have been provided with a multiplicity of strut members between the operative main spreader wing and the car body for holding the wing in its outwardly swung position, wings of this type being of such length as to extend along a major portion of the length of the car body. Particularly when vertical adjustments of the spreader wing are involved, the folding of the wing has required a great amount of labor and delay since it has been impossible to swing the wings directly inwardly by reason of the differential lengths of the various brace members. It is more particularly an important object of our invention to provide a vertically adjustable main spreader wing structure which is connected with the car body in such manner that, without detachment of any parts, said wing may be folded directly inwardly to lie along the car body, from any position of adjustment which said wing member may assume other than a position below the line of rails.

To accomplish this folding action of the wing and to increase the simplicity of the construction, we provide a spreader wing in which a single strut member is used to hold the wing for working operation in its desired position of horizontal angular adjustment. Furthermore, a single motor unit is provided, adapted for selective connection with the swinging mechanism of either of the main spreader wings. Mechanism is provided for adjusting each of the main spreader wings to selective outwardly swung positions and for holding each of the wings in such position which may be satisfactory to accurately determine the desired position of the wing prior to the swinging operation and automatically engage the wing on reaching such position.

Referring now more particularly to the accompanying drawings, our invention resides in the provision of a spreader plow structure wherein the parts are disposed in such relative position and are of such strength that we may employ a single strut member for holding each spreader wing in its outwardly swung position to effect the spreading or leveling of material against which it engages so that an exceedingly simple operating means for said wing is provided which possesses the primary advantage of permitting the wing to be swung inwardly directly from any desired position of elevational or vertical-angularity adjustment, thus avoiding the necessity of entire readjustment of the wing structure subsequent to each retraction of the wing, and procuring many other operative advantages, as will be later explained in detail.

In providing these structural relations, various factors of railway clearance, stress distribution and operative range must be considered and the present single strut wing structure is adapted to meet the working stresses and to provide the spreader capacity of that size of wings for which it has heretofore been found necessary to provide a multiplicity of strut members involving laborious operations in adjusting and retracting the wing. With respect to this main spreader wing structure, our invention therefore resides essentially in the provision of an arrangement wherein the stresses exerted against a spreader of this character may be met effectively at a minimum number of points and wherein adequate compensation is had throughout the entire structure for the relatively great stresses set up.

The spread wing and its associating and cooperating parts which form the subject matter of this present invention, are used as part of a spread plow for the purpose of distributing or spreading ballast, spoil and the like along side of or above or below a railroad track. When being used for this purpose the spreader wing is rotated about its vertical axis by means of the moving clutch and strut, and the car is forced along bringing the wing into engagement with the material to be moved, and the wing then acts as any small plow or spreader to push the material away.

By adjusting the length of the supporting member projecting upwardly from the wing, the inclination of the wing can be changed. If it drops down below the track, then the tendency will be to make an excavation or distribute the material along a profile extending down below the track. If the wing is inclined up, then the tendency will be to pile the material up in a bank, sloped upwardly and away from the track. The hinged pinion on which the wing is pivoted makes it possible to tilt the wing by raising it in any suitable way as for instance by block and tackle, and then changing the adjustable length of the supporting member.

The height of the entire wing may be varied by moving it bodily up and down by means of a hydraulic cylinder shown in connection with the wing, and this adjustment may be made either with or without change in the slope or angle of the wing, as the two adjustments are all together separate. The same is true of the adjustment which rotates the wing around a vertical axis. This adjustment may be made independent of any of the other adjustments.

It is understood that most of the work of the wing is done at or near the lower edge thereof, and there is therefore a tendency on the part of the wing to twist. When it twists there is a tendency for the wing to ride up on the work as the structure gives, and in practice it is found that if this twisting is not radically minimized, the wing will ride up on the work, and then when the pressure becomes too great, dig down deep and then ride up again so as to give a kind of sine curve contour to the work. In order to prevent this twisting the stiff truss like supporting member is provided pivoted to the wing at two points and having great depth in the direction of the load. This truck member anchored as it is at the upper end on the rigid wing, positively minimizes and almost entirely prevents any twisting of the wing.

The wing is built up of three separate sections, articulated together, and fastened by pins and pockets so that these pins may be pulled out of the separate sections, disengaged for adjustment, repair, storage, or even under extraordinary conditions for transportation, though normally the car is propelled with the wings drawn in parallel with the car body.

Special attention is directed to the arrangement of the outer wing section. It is pivoted on the central section by means of the rearwardly projecting lugs, and the two sections are held in parallelism by means of the safety lock members let into the first of the two sections. These links are of such strength that in the event that the outer end of the wing strikes an obstruction heavy enough to ditch the apparatus, the pressure will be sufficient to break these links and allow the outer wing section to swing back out of contact, rotating about the pivot pins in the lugs so that it will be easy for the operator as soon as the obstruction is removed, to swing the parts back into position and replace the broken lugs. Mounted on the center wing section, which it will be observed is exceedingly stiff and rigid to carry it, is a sliding ditcher plow. For strength and convenience this plow is mounted on the front face of the section being slidable in two parallel guides mounted on such front face. This plow has at its lower end a cutting edge shaped to cut the contour of the ditch to be dug and the like cross head and hydraulic piston, all mounted on the wing section, may be operated to raise and lower the plow. The hydraulically controlled locking pin is adapted to lock the plow in position, projecting any desired distance below the wing. When this ditcher feature is to be used, the ditcher plow will be projected beyond the wing, the wing will be lowered until it extends downwardly from the car body. It will then be forced along so that the dirt is cut away by the wing along the lines indicated by the contour lines in the drawings with the ditcher in its appropriate place. Different forms of shoes may be used to obtain different contours, or of course the shoe may be omitted. The adjustment, when it is necessary to change the apparatus, for use either as a ditcher or as a flat bottomed spreader wing can be made in the field in the usual way without running into the shop.

In the modified form shown in Figures 24 to 26 the operation is as follows:

The operator will not undertake to fold back or extend the outer wing section when there is any pressure on it or when any work is being done by it.

Starting with the parts in the position shown in Figures 25 and 26 in full lines, he will manipulate the air to move the piston to the right. This will cause the link to exert a tension, rotating about its pivotal connection on the link 266 and a fixed pivot until the bell crank lever has rotated and the holding pin has been drawn out from the holding lugs and brought up against the stop. At this time the engagement of the link 265 and the bell crank lever becomes the fixed fulcrum and further pulling on the link exerts a tension on the fulcrum link at the other end; since that link is located on the inner side of the pivot upon which the outer wing section is swung, the pull of the piston will tend to swing the outer wing section inwardly or fold the wing section.

When the operator decides to straighten the wing and bring the wing section into line with the body of the wing, he exerts pressure on the other side of the piston and this pressure tends first to rotate the bell crank lever in counter-clockwise direction, but, since the end of the lock pin is not in line with the hole in the lug but engages the flat table in extension of the lug, the bell crank cannot rotate and so the swinging lever is free to exert a pressure on the fulcrum link, tending to return the outer wing section to its straight line position, and it is only when the outer wing section comes back into line that the holding pin is forced by the cylinder pressure down into the locking position.

Summarizing now the general structure of our improved railway spreader plow, it will be seen that we have provided a highly efficient and compact apparatus which has an exceedingly large capacity for spreader work both with respect to its range of adjustment and with respect to the amount of material which may be moved at one time.

By making the structure sufficiently strong and heavy to provide for taking up the stresses of the wing at a minimum number of points, we are enabled to provide an exceedingly simple structure utilizing a single brace member in lieu of the multiplicity of brace members heretofore required for a spreader wing of anywise similar capacity, providing for the use of a simple mechanical operating mechanism for the spreader wings, and the increased strength and weight of parts which we have employed to provide for these novel structural relations, also conduce in general to the provision of a plow structure which is practically unbreakable in operation, yet which, should unsurmountable conditions be encountered, will yield at certain predetermined points, permitting the apparatus to be quickly restored to operation. Also, the weight of the main spreader wings incidental to their necessary strength and cast formation to procure minimum width as heretofore set forth, effects a counterbalance action in said wings against the vertical components of stress set up incidental to the work of the wing. The weight of the entire apparatus in the type of machine embodying our invention now on the market is approximately 68 tons, while each of the main spreader wings for this structure weighs approximately six tons, the weight of each thus having a material counterbalancing action.

We claim:

1. A railway spreader plow including a car structure and a wing member adjustably secured thereto and means for inclining it outwardly in relation thereto, said means adapted to release the wing member in response to a predetermined pressure thereagainst.

2. A railway spreader plow comprising a car structure, a wing member connected with the car structure and adapted to swing laterally therefrom, means for controlling the lateral swinging movement of the wing, said means pivotally connected to the wing adjacent the center thereof and slidably connected with the car structure, and means for holding the controlling means against sliding movement with respect to the car structure, said means adapted to yield to a predetermined pressure against the wing member.

3. A railway spreader plow including a car structure, a spreader wing pivotally connected with the car structure and adapted to swing laterally therefrom, and means for adjustably holding said wing in laterally swung position, means for swinging said wing in a vertical plane, and a pivoted compression-tension-torsion support for said wing, the lower end of said support pivoted to the wing by a wide, torsion resisting pivot portion, the upper end pivoted to the car structure substantially co-axially with the pivot of the wing.

4. A railway spreader plow including a car structure, a spreader wing pivotally connected to the car structure and adapted to swing outwardly therefrom, said swing being formed of a plurality of separate sections having longitudinally extending, vertically spaced interpenetrating connecting portions, said sections being hinged together, and means normally operative to prevent rotation of said sections in relation to each other but adapted to yield to a predetermined pressure against the wing.

5. A railway spreader plow including a car structure, a spreader wing pivotally connected to the car structure and adapted to swing laterally therefrom, said wing being formed of a plurality of separate sections having interpenetrating connecting portions, transversely opposed bolt members engaging said adjacent portions and adapted to hold them in rigid relation.

6. A railway spreader plow including a car structure, a spreader wing pivotally connected to the car structure and adapted to swing laterally therefrom, said wing being formed of a plurality of separate sections having longitudinally extending, vertically spaced interpenetrating connecting portions, transversely opposed bolt members engaging said adjacent portions and adapted to hold them in rigid relation and adapted to yield to a predetermined pressure against the wing.

7. A railway spreader plow comprising a car structure, a wing adapted to swing laterally from said structure, a supporting brace connected to said wing, its opposite end slidably connected with the car structure, and means yieldable to a predetermined stress for normally preventing its sliding movement in relation to the car body.

8. A railway spreader plow comprising a car structure, a spreader wing pivotally connected to the car structure and adapted to swing outwardly therefrom, said wing being formed of a plurality of separate articulated members and a single strut adapted to connect an inner member with the car structure and tensionally directly to support only such member, the outer member of such wing being supported upon the inner, the separate articulated members of the wing lying normally in the same plane.

9. A railway spreader plow including a car structure, a spreader wing connected with the car structure and adapted to swing laterally therefrom, an element adapted to hold the wing in laterally swung position, a supporting element pivoted to the car structure co-axially with the wing but above it, its outer end connected to the upper edge of the wing intermediate its length at a plurality of relatively widely separated points, the end of the supporting element and the upper edge of the wing being widened at their point of connection.

10. A railway spreader plow including a car structure, a spreader wing pivotally connected with the car structure and adapted to swing outwardly therefrom, said wing being formed of a plurality of cast metal sections having longitudinally extending, vertically spaced interpenetrating connecting portions, and means for adjustably holding said wing in laterally swung position.

11. A railway spreader plow including a car structure, a spreader wing pivotally connected with the car structure, and adapted to extend laterally therefrom, said wing being formed of a plurality of cast metal sections having longitudinally extending, vertically spaced interpenetrating connecting portions, transversely opposed bolt members engaged with said portions to hold the sections in rigid relation, and means for adjustably holding said wing in laterally swung position.

12. A railway spreader plow including a car structure, a wing connected with said car structure and adapted to swing laterally therefrom, means for holding the wing in laterally swung position, and means yieldable at predetermined stress for permitting collapse of the wing.

13. A railway spreader plow including a car structure, a wing connected with said car structure and adapted to swing laterally therefrom, a single strut member connecting said wing, and the car structure for holding the wing in laterally swung position, and means associated with said single strut member and yieldable at predetermined stress to permit collapse of the wing.

14. A railway spreader plow including a car structure, a wing connected with said car structure adapted to swing laterally therefrom, said wing comprising a plurality of sections, means for holding said wing in laterally swung position, and means connecting sections of the wing and yieldable at predetermined stress to permit collapse of the wing.

15. A railway spreader plow including a car structure, a wing connected with said car structure and adapted to swing laterally therefrom, said wing comprising a plurality of sections, means engaging the wing inwardly of the outer section thereof for holding the wing in laterally swung position, and means for connecting the outer section of the wing with the remaining portion thereof yieldable at predetermined stress.

16. A railway spreader plow including a car structure, a wing connected with said car structure and adapted to swing laterally therefrom, a strut member connected with said wing and slidably connected with the car structure, and means yieldable at predetermined stress for holding said strut member against sliding movement relative to the car body.

17. A railway spreader plow including a car structure, a spreader wing in connection with said car structure and adapted to swing laterally therefrom, said wing comprising a plurality of sections, means engaging the wing inwardly of the outer section thereof for holding the wing in laterally swung position, a hinge connection between the outer section of the wing and the remaining portion thereof, and bishop-bolts connecting said outer section of the wing and remaining portion to prevent hinge movement, said bishop-bolts being yieldable at predetermined stress.

18. A railway spreader plow including a car structure, a spreader wing in connection with said car structure and adapted to swing laterally therefrom, said wing comprising a plurality of sections, means engaging the wing inwardly of the outer section thereof for holding the wing in laterally swung position, a hinge connection between the outer section of the wing and the remaining portion thereof, and means connecting said outer section of the wing and remaining portion to prevent hinge movement, said means being yieldable at predetermined stress.

19. A railway spreader plow including a car structure, a spreader wing connected with the car structure and adapted to swing laterally therefrom, strut means for adjustably holding the wing in laterally swung position, and a combined tension and compression member connected with the car structure above the point of connection of the wing and inclined downwardly towards the wing and secured thereto at a plurality of transversely spaced points separated by a distance substantially greater than the normal thickness of the wing.

20. A railway spreader plow including a car structure, a spreader wing connected with the car structure and adapted to swing laterally therefrom, strut means for adjustably holding the wing in laterally swung position, and a brace member connected with the car structure at a point above the point of connection of the wing, said member being inclined downwardly and increased in width towards its lower end, and said wing member being increased in width adjacent the wide lower end of said brace member and connected therewith to provide lateral rigidity for torsion stresses set up in operation of the wing.

21. A railway spreader plow including a car structure, a wing having universal pivotal connection with the car structure, strut means for adjustably holding the wing in laterally swung position, a brace connected with the wing and with the car structure at a point above the point of connection of the wing, means for adjusting the length of said brace, a frame upwardly extending from the car body, adjacent the free end of the wing, to a height exceeding the height of the free end of the wing when in highest raised position, and means carried by said frame for raising the wing, including a flexible connection between said frame and the wing.

22. A railway spreader plow including an intermediate car body casting, forward and rear car body sections connected with said casting, a guide standard carried by the casting, truss frame bars connected with the standard and with the forward and rear car body sections, a spreader wing connected with the standard, and brace means connecting the wing and the rear car body section.

23. A railway spreader plow including a car body, a pair of standards rising from the car body and disposed in intersecting planes, a wing-carrying member, brackets on said wing-carrying member having portions engaging said standards, and a spreader wing carried by said member, said standards including a plurality of upwardly extending I-beams, rollers on said wing carrying member, engaging said I-beams, the brackets on said wing carrying member being in interlocking relation with said I-beams and being adapted to maintain said rollers opposed to the flanges of said I-beams.

24. A railway spreader plow including a car body, a spreader wing connected with said car body and adapted to swing outwardly therefrom, a carriage member slidable on the car body, a strut connection between said carriage member and wing, means for applying power to move such carriage and the inner end of the strut to swing the wing, and means automatically engageable with said carriage to hold said carriage against sliding movement upon movement of said carriage to a desired limit.

25. A railway spreader plow including a car body, a spreader wing connected with said car body and adapted to swing outwardly therefrom, a carriage member slidable on the car body, a strut connection between said carriage member and wing, means for employing power to move such carriage and the inner end of the strut to swing the wing, a holding member adjustably carried by the car body, and means for connecting said adjustable holding member and the carriage member for holding the wing in desired outwardly swung position.

26. A railway spreader plow including a car body, a spreader wing connected with said car body and adapted to swing outwardly therefrom, a carriage member slidable on the car body, a strut connection between said carriage member and wing, means for applying power to move such carriage and the inner end of the strut to swing the wing, a holding member adjustable along the car structure for engagement by the carriage member, and a pawl carried by one of said members for securing said members together.

27. A railway spreader plow including a car body, a spreader wing connected with said car body and adapted to swing outwardly therefrom, a carriage member slidable on the car body, a strut connection between said carriage member and wing, means for applying power to move such carriage and the inner end of the strut to swing the wing, a holding member adjustable along the car structure for engagement by the carriage member, a pawl carried by one of said members for securing said members together, said pawl being automatically engageable upon movement of the members together, power means for moving the carriage, and means operable from a remote point for releasing the pawl.

28. A railway spreader plow including a car body, a spreader wing connected with said car body and adapted to swing outwardly therefrom, a carriage member slidable on the car body, a single strut member pivotally connected with the carriage member and with the wing, means for applying power to move such carriage and the inner end of the strut to swing the wing, a holding member adjustably carried by the car body, and means for connecting said adjustable holding member and the carriage member for holding the wing in desired outwardly swung position.

29. A railway spreader plow including a car body, a spreader wing connected with said car body and adapted to swing outwardly therefrom, a carriage member slidable on the car body, a strut connection between said carriage member and wing, means for applying power to move such carriage and the inner end of the strut to swing the wing, a holding member movable along the carriage structure, the adjacent portion of the car structure being provided with a series of holes, a pin for connection with said member and selective engagement in one of said holes, and means for connecting said holding member and carriage member.

30. A railway spreader plow including a car body, a spreader wing connected with said car body and adapted to swing outwardly therefrom, a carriage member slidable on the car body, a strut connection between said carriage member and wing, means for applying power to move such carriage and the inner end of the strut to swing the wing, a holding member movable along the car structure, the adjacent portion of the car structure being provided with a series of holes, a pin for connection with said member and selective engagement in one of said holes, said pin having a predetermined shearing factor to yield upon excessive stress imparted to the wing, and means for connecting said holding member and carriage member.

31. A railway spreader plow including a car structure, a wing connected with said car structure and adapted to swing outwardly therefrom, a carriage member slidable along the car structure, a strut connection between said carriage member and wing, pulleys adjacent the path of travel of said carriage member, a flexible member trained about said pulleys and connected with the carriage member, and means for driving one of said pulleys.

32. A railway spreader plow including a car structure, a wing connected with said car structure and adapted to swing outwardly therefrom, a carriage member slidable along the car structure, a strut connection between said carriage member and wing, pulleys adjacent the ends of the path of travel of said carriage member, a flexible member trained about said pulleys and connected with the carriage member, a shaft connected with one of said pulleys and extending transversely of the car structure, a longitudinally extending cylinder carried by the car structure, a piston-rack operable by fluid in the cylinder, and a gear connection between said rack and said shaft.

33. A railway spreader plow including a car structure, a spreader wing connected with each side of the car structure and adapted to be swung outwardly therefrom, a pair of carriages movable along the car structure, strut connections between said carriages and the wings, means for shifting each of said carriages, and a single source of power adapted for connection selectively with either of said carriage shifting means.

34. A railway spreader plow including a car body, a spreader wing connected with each side of the car body and adapted to be swung outwardly therefrom, a pair of carriages movable along the car body, strut connections between said carriages and the wings, a pair of rotatable members on the car body, connections between said members and the carriages for shifting the carriages, and a pair of driven clutch members selectively engageable with said rotary members.

35. A railway spreader plow including a car body, a spreader wing connected with each side of the car body and adapted to swing laterally therefrom, a pair of carriages movable along the car body, strut connections between said carriages and the wings, a transverse shaft on the car body, a pair of rotatable members loose on the shaft, connections between said members and the carriages for shifting the carriages, means for driving said shaft in either direction, and clutch members splined on the shaft and selectively engageable with said rotary members.

36. A railway spreader plow including a car body, a spreader wing connected with each side of the car body and adapted to swing laterally therefrom, a pair of carriages movable along the car body, strut connections between said carriages and the wings, a fluid pressure cylinder, a drive mechanism for each of said carriages, means for actuating each of said drive mechanisms including clutch members driven from said cylinder, means for operating the clutches, and means controlled by said clutch operating means for governing flow of fluid into the cylinder, whereby to limit flow of fluid into the cylinder in neutral position of said clutches.

37. A railway spreader plow including a car body, a spreader wing connected with each side of the car body and adapted to swing laterally therefrom, a pair of carriages movable along the car body, strut connections between said carriages and the wings, a transverse shaft on the car body, a pair of rotatable members loose on the shaft, connections between said members and the carriages for shifting the carriages, means for driving said shaft including a fluid pressure cylinder, means for simultaneously operating said clutches, and means controlled by said clutch operating means for governing flow of fluid into the cylinder whereby to limit flow of fluid into the cylinder in neutral position of said clutches.

38. A railway spreader plow including a car structure, a wing pivotally connected with said car structure and adapted to swing outwardly therefrom, a carriage member slidable on the car structure, a strut connection between said carriage member and wing for moving the wing, means for moving the carriage member, and means independent of said carriage for imparting initial outward swinging movement to said wing.

39. A railway spreader plow including a car structure, a wing pivotally connected with said car structure and adapted to swing outwardly therefrom, a carriage member slidable on the car structure, a strut member pivoted to the carriage and pivoted to the wing, the pivotal connection of the wing and strut member being movable inwardly of a line drawn through the other said pivotal connections of the wing and brace member, and means for imparting initial swinging movement to the wing.

40. A railway spreader plow including a car structure, a wing pivotally connected with said car structure and adapted to swing outwardly therefrom, a carriage member slidable on the car structure, a strut connection between said carriage member and wing for moving the wing, means for moving the carriage member, a transverse fluid pressure cylinder carried by the car structure, and a plunger projecting from the cylinder and engageable with the wing to impart initial swinging movement thereto.

41. A ditcher comprising an adjustable wing having a lower surface shaped to fit the contour of a railroad road bed, means for supporting said wing and for rotating it about a vertical axis, a ditcher blade carried by the wing and lying in a plane generally parallel to the plane of the wing portion to which it is attached, and movable in relation thereto, and means on the spreader wing for projecting and retracting said ditcher blade.

42. A ditcher comprising an adjustable wing having a lower surface shaped to fit the contour of a railroad road bed, means for supporting said wing and for rotating it about a vertical axis, a ditcher blade carried by the wing and lying in a plane generally parallel to the plane of the wing portion to which it is attached, and movable in relation thereto, and means on the spreader wing for projecting and retracting said ditcher blade, and locking means for said ditcher blade adapted to lock it selectively at a plurality of positions.

43. A ditcher comprising an adjustable wing having a lower surface shaped to fit the contour of a railroad road bed, means for supporting said wing and for rotating it about a vertical axis, a ditcher blade carried by the wing and lying in a plane generally parallel to the plane of the wing portion to which it is attached, and movable in relation thereto, and means on the spreader wing for projecting and retracting said ditcher blade, the means for operating the wing being pneumatic.

44. A ditcher comprising an adjustable wing having a lower surface shaped to fit the contour of a railroad road bed, means for supporting said wing and for rotating it about a vertical axis, a ditcher blade carried by the wing and lying in a plane generally parallel to the plane of the wing portion to which it is attached, and movable in relation thereto, the wing having a pivotally mounted outer end section, and means for moving the ditcher blade and the outer wing section.

45. In a railroad spreader, a wing mounted for rotation about a horizontal axis, and a plurality of means for holding said wing against twisting comprising in part, a tension, torsion and compression element, such element being laterally widened and braced adjacent its lower end, such lower end being in pivotal relation with the upper edge of the wing.

46. In a railroad spreader, a wing mounted for rotation about a horizontal axis, means for holding said wing against twisting comprising reinforcing brackets projecting rearwardly from the back of the wing, a support projecting upwardly from the car upon which the wing is pivoted, and a truss beam extending downwardly from the support to engage the wing and the reinforcing brackets thereon.

47. In a railroad spreader, a wing mounted for rotation about a horizontal axis, means for holding said wing against twisting comprising reinforcing brackets projecting rearwardly from the back of the wing, a support projecting upwardly from the car upon which the wing is pivoted and a truss beam extending downwardly from the support to engage the wing and the reinforcing brackets thereon, the truss beam increasing in depth downwardly to the point where it engages the wing.

48. A railway spreader plow comprising a car structure, a spreader wing pivoted to said car structure upon a substantially vertical pivot and adjustable in relation to said car structure with respect to its height and vertical angularity and adapted to swing laterally from the car structure, a power driven carriage laterally slidable along the car body, a strut connecting said carriage and said wing and means for moving said wing about its vertical axis comprising power driven means for moving said carriage along said car body.

49. In a railroad spreader, a wing mounted for rotation about a horizontal axis, a support for said wing comprising a tension, compression and torsion resisting element and a single strut extending between the spreader and the wing.

WALTER FERRIS.
MARK J. WOODHULL.